United States Patent [19]

Hasegawa et al.

[11] 4,409,948

[45] Oct. 18, 1983

[54] EXHAUST GAS RECIRCULATION CONTROL SYSTEM HAVING A FUNCTION OF AUTOMATICALLY CORRECTING DETECTED ZERO OPENING VALUE OF EXHAUST GAS RECIRCULATION VALVE

[75] Inventors: Shumpei Hasegawa, Niiza; Akihiro Yamato, Sayama; Yutaka Otobe, Shiki, all of Japan

[73] Assignee: Honda Giken Kogyo Kabushiki Kaisha, Tokyo, Japan

[21] Appl. No.: 373,056

[22] Filed: Apr. 29, 1982

[30] Foreign Application Priority Data

May 8, 1981 [JP] Japan .................................. 56-69091

[51] Int. Cl.³ ............................................ F02M 25/06
[52] U.S. Cl. .................................... 123/571; 123/417; 123/480
[58] Field of Search ................. 123/571, 569, 417, 480

[56] References Cited

U.S. PATENT DOCUMENTS

4,181,944  1/1980  Yamauchi et al. .............. 123/571 X

Primary Examiner—Wendell E. Burns
Attorney, Agent, or Firm—Lyon & Lyon

[57] ABSTRACT

An exhaust gas recirculation control system which is adapted to control the valve opening of the exhaust gas recirculation valve so as to minimize the difference between a detected value of the valve opening of the above valve and a command value read from a memory as a function of operating condition of the engine. The system includes a memory means adapted to store as a new reference zero position value an actual value of the valve opening detected when a command value for full closing of the valve is continuously read from the memory for a predetermined period of time, and an arithmetic means adapted to perform substraction of the value stored in the above memory means from a subsequently detected value of the valve opening or addition of the stored value to a command value subsequently read from the memory, thereby automatically compensating for changes in the detected zero opening value of the exhaust gas recirculation valve.

6 Claims, 15 Drawing Figures

| Ne\PB | $P_{B6}$ | $P_{B7}$ | --- | $P_{Bj}$ | --- | $P_{B15}$ |
|---|---|---|---|---|---|---|
| $N_1$ | $L_{1\cdot 6}$ | $L_{1\cdot 7}$ | | | | |
| $N_2$ | $L_{2\cdot 6}$ | $L_{2\cdot 7}$ | | | | |
| ⋮ | | | | | | |
| $N_i$ | | | | $L_{ij}$ | | |
| ⋮ | | | | | | |
| $N_{10}$ | | | | | | $L_{10\cdot 15}$ |

| FIG. 8A | FIG. 8B |

FIG. 9B

EXHAUST GAS RECIRCULATION CONTROL SYSTEM HAVING A FUNCTION OF AUTOMATICALLY CORRECTING DETECTED ZERO OPENING VALUE OF EXHAUST GAS RECIRCULATION VALVE

BACKGROUND OF THE INVENTION

This invention relates to an exhaust gas recirculation control system for internal combustion engines, and more particularly to an automatic compensating device for automatically correcting a detected zero opening value of the exhaust gas recirculation valve to ensure accurate exhaust gas recirculation control.

A fuel supply control system is conventionally known which is adapted particularly for use with a gasoline engine and in which a fuel-injection type fuel quantity adjusting means for supplying fuel to the engine has its valve opening period electronically controlled so as to control the air/fuel ratio of an air/fuel mixture being supplied to the engine to a predetermined value.

As one of such fuel supply control systems there has been proposed e.g. by U.S. Pat. No. 3,483,851 a system which is adapted to determine the valve opening period of the fuel quantity adjusting means by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient conecentration (oxygen concentration), etc.

On the other hand, in an engine provided with an exhaust gas recirculation system (EGR), it is necessary to control the valve opening period of the fuel quantity adjusting means to different values between when the exhaust gas recirculation system is operating and when the same system is at rest. To put into practice such exhaust gas recirculation control, two different maps can be provided, for instance, which comprise a plurality of predetermined basic values of the valve opening period of the fuel quantity adjusting means, which are different from each other, and which are functions of different combinations of engine rpm and intake pipe absolute pressure. Selection of the two maps depends upon whether or not the exhaust gas recirculation system is operating. In carrying out exhaust gas recirculation control by using such two different maps, determination as to whether or not the exhaust gas recirculation system is operating can be made by comparing between an actual valve opening (valve lift) value of the exhaust gas recirculation valve and a valve opening (valve lift) command value selected from a map of required valve opening or lift values as a function of engine rpm and intake pipe absolute pressure. The above actual valve opening or lift value can be detected by a suitable detecting device, for instance, a lift sensor formed of a potentiometer which is connected to the valve body of the exhaust gas recirculation valve.

However, there can be a change in the reference zero position of the exhaust gas recirculation valve, that is, the valve opening value detected by the lift sensor when the valve body is in its full closing position, due to thermal expansion and wear of the component parts of the valve, etc. This causes a difference between an actual valve opening value and a valve opening value detected by the lift sensor or the like so that, for instance, even if the actual valve opening value is zero, the output of the lift sensor or the like shows a detected value other than zero. Therefore, it is impossible to accurately control the valve opening period of the fuel quantity adjusting means which should be controlled to values different between when the exhaust gas recirculation system is operating and when it is not operating, resulting in inaccuracy of the fuel supply control. Moreover, the above phenomenon also prevents accurate exhaust gas recirculation control which is carried out on the basis of the valve opening or lift command value.

OBJECT AND SUMMARY OF THE INVENTION

It is the object of the invention to provide an exhaust gas recirculation control system which has a function of automatically correcting a detected zero opening value of the exhaust gas recirculation valve, in such a manner that when a valve opening command value for full closing of the valve is continuously selected or read from a map of required valve opening values for a predetermined period of time, an actual valve opening value which is detected upon a lapse of the above predetermined period of time is used as a new reference zero position of the valve, for correction of a subsequently detected valve opening value or a subsequently selected valve opening command value.

The present invention provides an exhaust gas recirculation control system for combination with an internal combustion engine, which comprises: an exhaust gas recirculation passageway connecting the exhaust pipe of the engine to the intake pipe of same; an exhaust gas recirculation valve having a controllable valve opening and arranged across the above passageway for opening and closing same; detecting means for detecting a particular operating condition of the engine where the exhaust gas recirculation should be carried out; first memory means storing a plurality of different required valve opening values of the exhaust gas recirculation valve, which are functions of operating condition of the engine; a sensor for detecting an actual value of the valve opening of the exhaust gas recirculation valve; difference determining means for determining the difference between a valve opening value detected by the above sensor and a required valve opening value read from the first memory means; control means for controlling the valve opening of the exhaust gas recirculation valve so as to minimize the above difference obtained by the difference determining means; full closing command determining means for determining whether or not a required valve opening value read from the first memory means corresponds to full closing of the exhaust gas recirculation valve; timer means adapted to generate a signal when the full closing command determining means continuously generates a signal indicative of a required valve opening value read from the first memory means corresponding to full closing of the valve, for a predetermined period of time; second memory means adapted to store as a reference value a valve opening value which is detected by the above sensor when the second memory means is supplied with the above signal generated by the timer means; and correcting means for correcting either one of a subsequently detected valve opening value and a subsequently read required valve opening value, by the value stored in the second memory means.

The above and other objects, features and advantages of the invention will be more apparent from the ensuing

DETAILED DESCRIPTION

The present invention will now be described in detail with reference to the drawings.

Figures 1, 2:
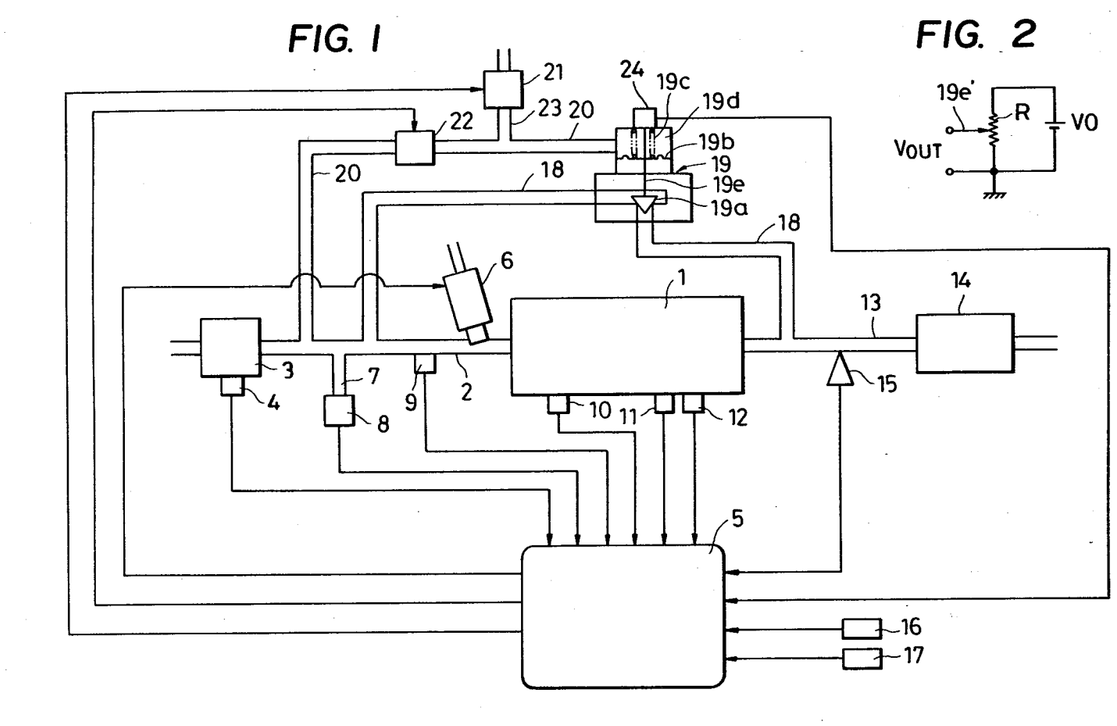
FIG. 1 is a block diagram illustrating a fuel supply control system to which is applicable the exhaust gas recirculation control system according to the present invention.
FIG. 2 is a schematic view illustrating the basic construction of the lift sensor in FIG. 1.

Referring now to FIG. 1, there is illustrated the whole arrangement of a fuel supply control system for internal combustion engines, to which the present invention is applicable. Reference numeral 1 designates an internal combustion engine which may be a four-cylinder type, for instance. This engine 1 has main combustion chambers which may be four in number and sub combustion chambers communicating with the main combustion chambers, none of which is shown. An intake pipe 2 is connected to the engine 1, which comprises a main intake pipe communicating with each main combustion chamber, and a sub intake pipe with each sub combustion chamber, respectively, neither of which is shown. Arranged across the intake pipe 2 is a throttle body 3 which accommodates a main throttle valve and a sub throttle valve mounted in the main intake pipe and the sub intake pipe, respectively, for synchronous operation. Neither of the two throttle valves is shown. A throttle valve opening sensor 4 is connected to the main throttle valve for detecting its valve opening and converting same into an electrical signal which is supplied to an electronic control unit (hereinafter called "ECU") 5.

A fuel injection device 6 is arranged in the intake pipe 2 at a location between the engine 1 and the throttle body 3, which comprises main injectors and a subinjector, none of which is shown. The main injectors correspond in number to the engine cylinders and are each arranged in the main intake pipe at a location slightly upstream of an intake valve, not shown, of a corresponding engine cylinder, while the subinjector, which is single in number, is arranged in the sub intake pipe at a location slightly downstream of the sub throttle valve, for supplying fuel to all the engine cylinders. The main injectors and the subinjector are electrically connected to the ECU 5 in a manner having their valve opening periods or fuel injection quantities controlled by signals supplied from the ECU 5.

On the other hand, an absolute pressure sensor 8 communicates through a conduit 7 with the interior of the main intake pipe of the throttle body 3 at a location immediately downstream of the main throttle valve. The absolute pressure sensor 8 is adapted to detect absolute pressure in the intake pipe 2 and applies an electrical signal indicative of detected absolute pressure to the ECU 5. An intake-air temperature sensor 9 is arranged in the intake pipe 2 at a location downstream of the absolute pressure sensor 8 and also electrically connected to the ECU 5 for supplying thereto an electrical signal indicative of detected intake-air temperature.

An engine temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle each time the engine crankshaft rotates through 180 degrees, i.e., upon generation of each pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting atmospheric pressure and a starter switch 17 for actuating the starter, not shown, of the engine 1, respectively, for supplying an electrical signal indicative of detected atmospheric pressure and an electrical signal indicative of its own on and off positions to the ECU 5.

An exhaust gas recirculating passageway 18 is provided which connects the exhaust pipe 13 to the intake pipe 2, and across which is mounted an exhaust gas recirculation valve 19. This valve 19 is a negative pressure-actuated type and comprises a valve body 19a arranged for opening and closing the passageway 18, a diaphragm 19b coupled to the valve body 19a by means of a valve rod 19e and actuatable by atmospheric pressure or negative pressure which is selectively applied thereto by means of EGR control valves 21 and 22, hereinlater referred to, and a spring 19c urging the diaphragm 19b in the valve closing direction. A negative pressure chamber 19d is defined by the diaphragm 19b, which is connected to a communication passageway 20 for introducing absolute pressure in the intake pipe 2 by way of the EGR control valve 22 which is a normally closed type and arranged across the communication passageway 20. An atmospheric pressure-intake passageway 23 is joined to the communication passageway 20 at a location downstream of the EGR control valve 22 so that atmospheric pressure is introduced into the communication passageway 20 by way of the EGR control valve 21 which is a normally open type and which is arranged across the communication passageway 23, and then guided into the negative pressure chamber 19d. The EGR control valves 21 and 22 are both electrically connected to the ECU 5 for operation in unison with each other or alone in response to control signals from the ECU 5 to control the lifting motion of the valve body 19a of the exhaust gas recirculation valve 19 and the moving speed thereof.

A lift sensor 24, which may be formed of a potentiometer, is mounted on the exhaust gas recirculation valve 19 for detecting the operating position of the valve body 19a of the valve 19 and supplying an electrical signal indicative of its detected operating position of the valve body to the ECU 5. More specifically, as shown in FIG. 2, the lift sensor 24 comprises a variable resistor in which a movable element 19e' which is movable in unison with the valve rod 19e of the valve 19 is disposed in slidable contact with a resistance R. As the valve body 19a of the valve 19 is displaced, the movable element 19e' is moved along the resistance R to cause a change in the output voltage VOUT of the sensor, which is a divided voltage of the power source voltage VO.

Next, the fuel quantity control action of the fuel supply control system of the invention arranged as above will now be described in detail with reference to FIG. 1 referred to hereinabove and FIGS. 3 through 9.

Figure 3:
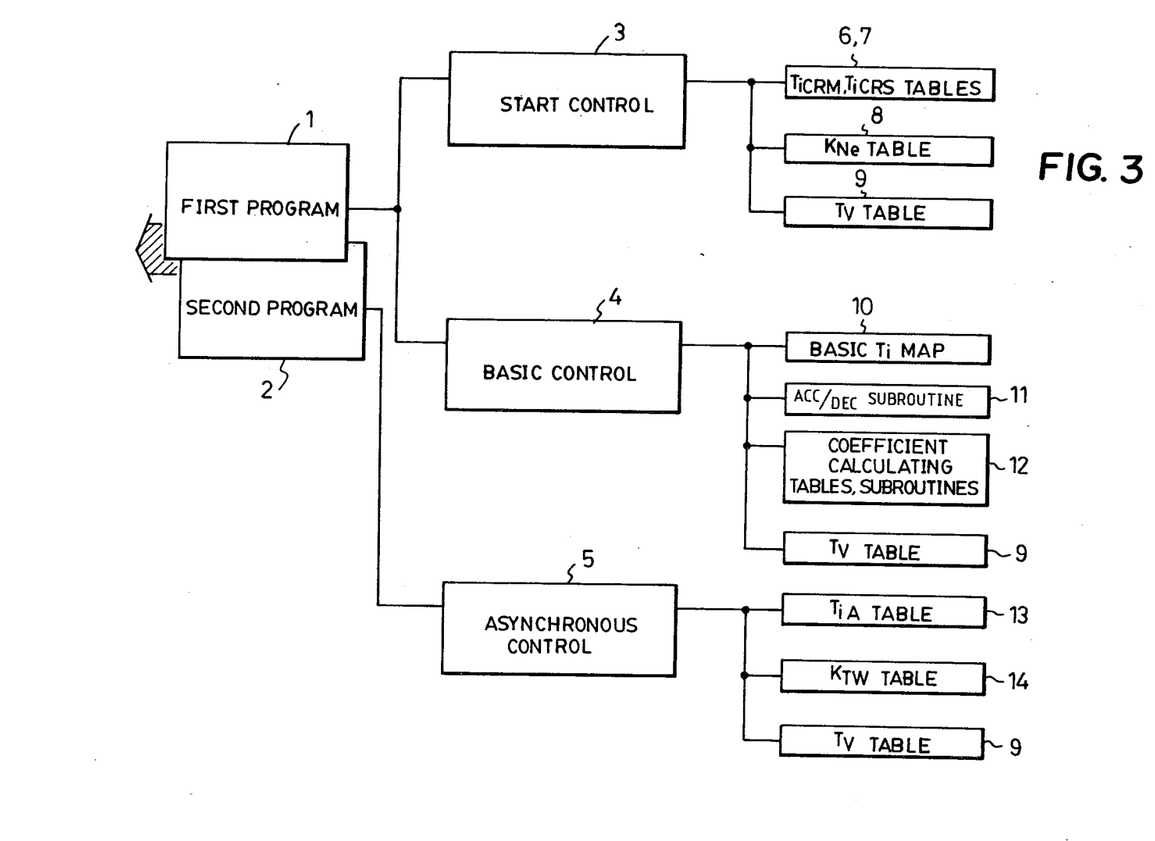
FIG. 3 is a block diagram illustrating a program for control of the valve opening periods TOUTM and TOUTS of the main injectors and the subinjector, which is operated by an electronic control unit (ECU) in FIG. 1.

Referring first to FIG. 3, there is illustrated a block diagram showing the whole program for air/fuel ratio control, i.e. control of valve opening periods TOUTM, TOUTS of the main injectors and the subinjector, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (1)$$

$$TOUTS = TiCRS \times KNe + TV \quad (2)$$

where TiCRM, TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing in response to changes in the output voltage of the battery, which is determined from a TV table 9. $\Delta TV$ is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KAFC \times KPA \times KAST \times KWOT \times KO_2 \times KLS) + TACC \times (KTA \times KTWT \times KAFC \times KPA \times KAST) + (TV + \Delta TV) \quad (3)$$

$$TOUTS = (TiS - TDEC) \times (KTA \times KTW \times KAST \times KPA) + TV \quad (4)$$

where TiM, TiS represent basic values of the valve opening periods for the main injectors and the subinjector, respectively, and are determined from a basic Ti map 10, and TDEC, TACC represent constants applicable, respectively, at engine decceleration and at engine acceleration and are determined by acceleration and decceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable afer the start of the engine and determined by a subroutine. KWOT is a coefficient for enriching the air/fuel mixture, which is applicable at wide-open-throttle and has a constant value, $KO_2$ an "$O_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture. TACC is a fuel increasing constant applicable at engine acceleration and determined by a subroutine and from a table.

On the other hand, the valve opening period TMA for the main injectors which is applicable in asynchronism with the TDC signal is determined by the following equation:

$$TMA = TiA \times KTWT \times KAST + (TV + \Delta TV) \quad (5)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

Figure 4:
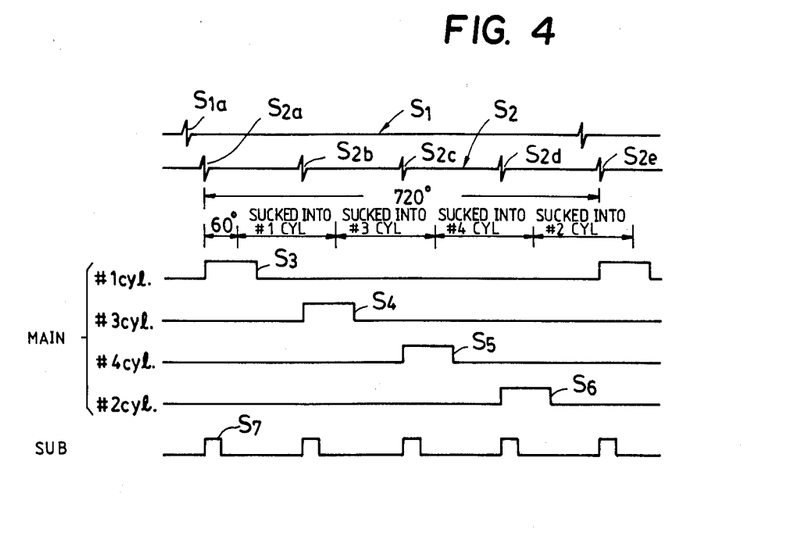
FIG. 4 is a timing chart showing the relationship between a cylinder-discriminating signal and a TDC signal inputted to the ECU, and drive signals for the main injectors and the subinjector, outputted from the ECU.

FIG. 4 is a timing chart showing the relationship between the cylinder-discriminating signal and the TDC signal, both inputted to ECU 5, and the driving signals outputted from the ECU 5 for driving the main injectors and the subinjector. The cylinder-discriminating signal $S_1$ is inputted to the ECU 5 in the form of a pulse $S_1$ a each time the engine crankshaft rotates through 720 degrees. Pulses $S_2a$–$S_2e$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors of the four engine cylinders. More specifically, the driving signal $S_3$ is outputted for driving the main injector of the first engine cylinder, concurrently with the first TDC signal pulse $S_2a$, the driving signal $S_4$ for the third engine cylinder concurrently with the second TDC signal pulse $S_2b$, the driving signal $S_5$ for the fourth cylinder concurrently with the third pulse $S_2c$, and the driving signal $S_6$ for the second cylinder concurrently with the fourth pulse $S_2d$, respectively. The subinjector driving signal $S_7$ is generated in the form of a pulse upon application of each pulse of the TDC signal to the ECU 5, that is, each time the crankshaft rotates through 180 degrees. It is so arranged that the pulses $S_2a$, $S_2b$, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake pipe before the piston reaches its top dead center and the operation of the associated injector.

Figures 5, 5A:
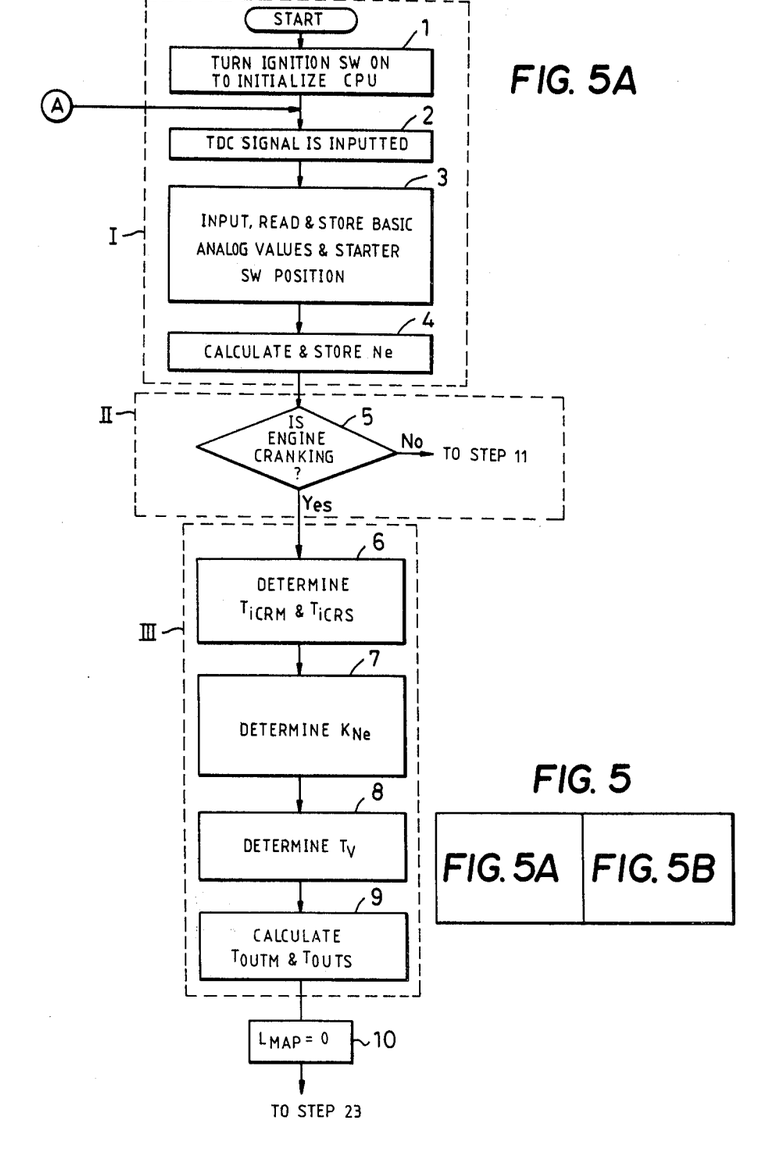
FIGS. 5A, 5B is a flow chart showing a main program for control of the fuel supply inclusive of the exhaust gas recirculation control.
Figure 5B:
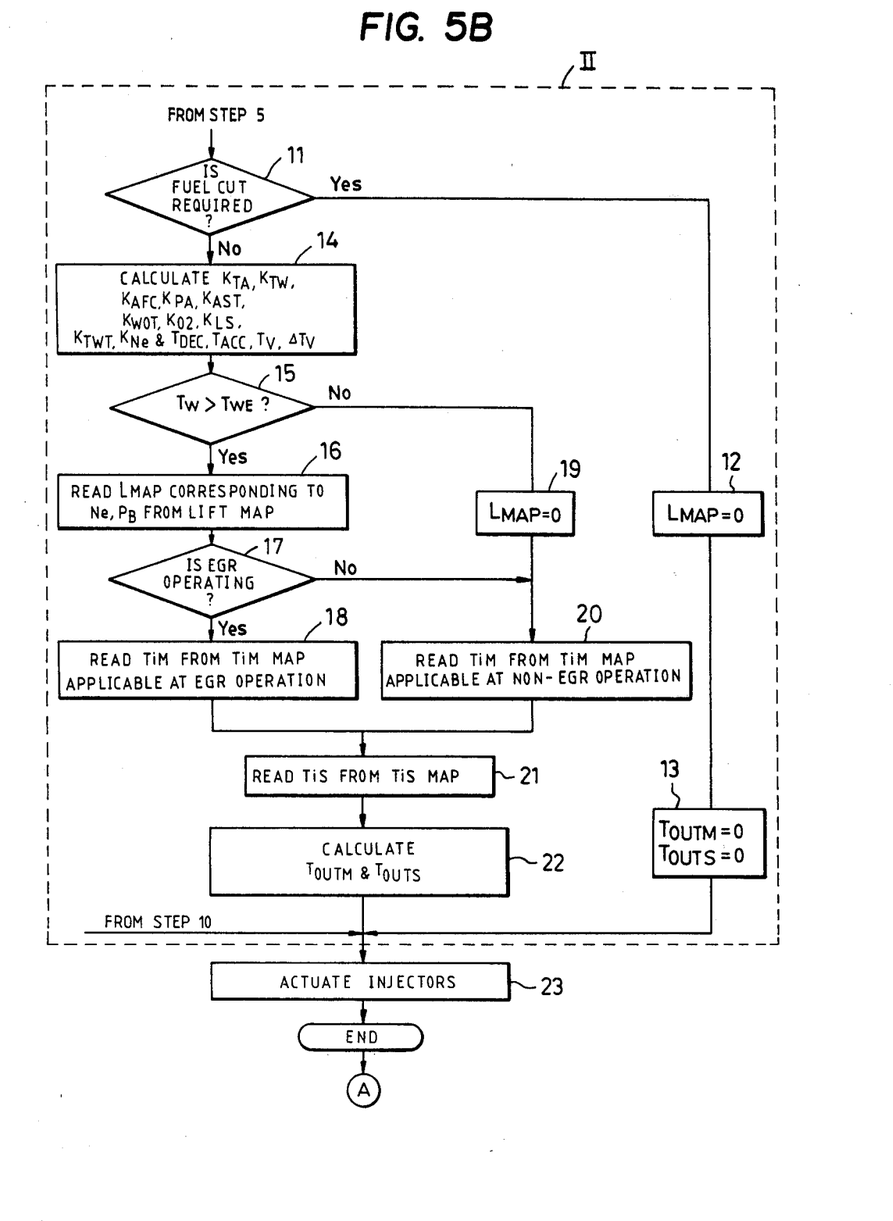

Referring next to FIG. 5, there is shown a flow chart of the aforementioned first program 1 for control of the valve opening period in synchronism with the TDC signal in the ECU 5. The whole program comprises an input signal processing block I, a basic control block II and a start control block III. First in the input signal processing block I, when the ignition switch of the engine is turned on, CPU in the ECU 5 is initialized at the step 1 and the TDC signal is inputted to the ECU 5 as the engine starts at the step 2. Then, all basic analog values are inputted to the ECU 5, which include detected values of atmospheric pressure PA, absolute pressure PB, engine cooling water temperature TW, atmospheric air temperature TA, valve body lift L of the exhaust gas recirculation valve 19, throttle valve opening θth, battery voltage V, output voltage value V of the $O_2$ sensor and on-off state of the starter switch 17, some necessary ones of which are then stored therein (step 3). Further, the period between a pulse of the TDC signal and the next pulse of same is counted to calculate actual engine rpm Ne on the basis of the counted value, and the calculated value is stored in ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 6). Also, the value of Ne-dependent correction coefficient KNe is determined by using the KNe table (step 7). Further, the value of battery voltage-dependent correction constant TV is determined by using the TV table (step 8). These determined values are applied to the aforementioned equations (1), (2) to calculate the values of TOUTM, TOUTS (step 9).

Figure 6:
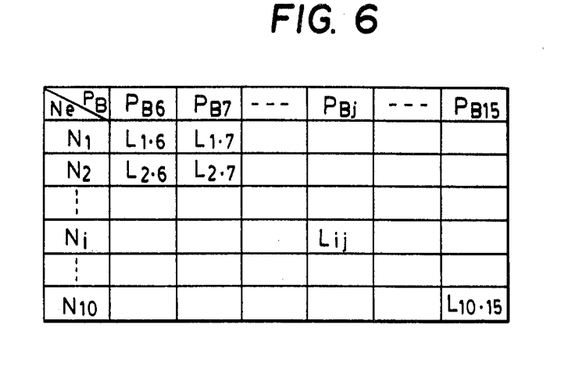
FIG. 6 is a view showing a map of valve lift command values for the exhaust gas recirculation valve in FIG. 1.

During the start control subroutine I described above, a valve lift command value LMAP which indicates zero lift is selected at the step 10, to set the valve body lift of the exhaust gas recirculation valve 19 to zero. FIG. 6 shows a map of the lift command value LMAP, where ten steps of different predetermined values PB6–15 of the absolute pressure PB are provided which are set within a range of 204–780 mmHg for instance, and ten steps of different predetermined values N1–10 of the engine rpm Ne set within a range of 0–4000 rpm for instance.

If the answer to the question of the above step 5 is no, it is determined whether or not the engine is in a condition for carrying out fuel cut, at the step 11. If the answer is yes, a lift command value LMAP is selected which indicates zero lift, at the step 12, and simultaneously the values of TOUTM and TOUTS are set to zero, at the step 13.

On the other hand, if the answer to the question of the step 11 is negative, calculations are carried out of values of correction coefficients KTA, KTW, KAFC, KPA, KAST, KWOT, $KO_2$, KLS, KTWT, etc. and values of correction constants TDEC, TACC, TV, and ΔTV, by means of the respective calculation subroutines and tables, at the step 14.

Then, a comparison is made of whether or not actual engine cooling water temperature TW is higher than a predetermined value TWE for carrying out the exhaust gas recirculating operation, at the step 15. If it is found that the former is higher than the latter, a lift command value LMAP is selected from the lift command value map, which corresponds to actual engine rpm Ne and actual intake pipe absolute pressure PB, at the step 16. Then, it is determined whether or not the exhaust gas recirculation valve 19 is operating, at the step 17. The engine operation where the valve 19 is operating will be referred to as "EGR operation" hereinafter, and that where it is at rest as "non-EGR operation", respectively. If the answer to the question of the step 17 is yes, a basic valve opening period value TiM is selected from a TiM map applicable during EGR operation, which corresponds to actual engine rpm Ne and actual absolute pressure PB, at the step 18. If the answer is negative at the step 17, another basic valve opening value TiM is selected from another map of the TiM value applicable during non-EGR operation, which corresponds to actual engine rpm Ne and actual absolute pressure PB, at the step 20.

On the other hand, if the determination at the step 15 gives a negative answer, a lift command value LMAP indicative of zero lift is selected at the step 19, while simultaneously a basic value TiM is selected from the non-EGR operation TiM map, which corresponds to actual engine rpm Ne and actual absolute pressure PB, at the step 20.

Following the above selection of the basic value TiM, a basic valve opening period value TiS is selected from a map of the TiS value, which corresponds to actual engine rpm Ne and actual absolute pressure PB, at the step 21.

Then, calculations are carried out of the values TOUTM, TOUTS on the basis of the values of correction coefficients and correction constants selected as described above, using the aforementioned equations (3), (4) (the step 22). The main injectors and the subinjector are actuated with valve opening periods corresponding to the values of TOUTM, TOUTS obtained by the aforementioned steps 9, 13 and 22 (the step 23).

As previously stated, in addition to the above-described control of the valve opening periods of the main injectors and the subinjector in synchronism with the TDC signal, asynchronous control of the valve opening periods of the main injectors is carried out in a manner asynchronous with the TDC signal but synchronous with a certain pulse signal having a constant pulse repetition period, detailed description of which is omitted here.

As shown in FIG. 5, the basic control program of the exhaust gas recirculation involves usual EGR operation which is carried out in response to lift command values LMAP corresponding to actual engine rpm Ne and actual absolute pressure PB, and determination as to whether or not the EGR operation is being carried out, which is made on the basis of a difference between an actual lift LACT of the valve body of the exhaust gas recirculation valve 19 in FIG. 1 and a lift command value LMAP selected as a function of actual engine rpm Ne and actual absolute pressure PB.

However, as previously stated, there can occur a change in the reference zero position or detected lift sensor output of the exhaust gas recirculation valve 19 when the valve body is in its full closing position, due to thermal expansion or wear of the component parts of the valve 19, etc. As a consequence, the output signal of the lift sensor 24 which is connected to the valve body 19a for generating the above output signal indicative of a detected position of the valve body does not represent a true actual lift of the valve body 19a, which impedes carrying out fuel supply control and exhaust gas recirculation control with accuracy.

According to the invention, when the lift command value LMAP selected continuously shows a value of 0 for three seconds for instance, the value of the valve lift detected by the lift sensor 24 is treated as a new reference zero position L$\Phi$, to eliminate the above-mentioned disadvantage. The subroutine for executing this reference zero position correction will now be explained with reference to FIG. 7. It is first determined whether or not a lift command value LMAP selected as a function of actual engine rpm Ne and actual absolute pressure PB is zero, at the step 1. If the answer is yes, an associated timer starts counting upon the value LMAP becoming zero, at the step 2. Then, determination is made, by means of the above counting, as to whether or not the state in which the value LMAP remains zero has continued for the predetermined period of time (3 seconds, for instance), at the step 3. If the answer is yes, renewal of the reference zero position L$\Phi$ is made at the step 4. That is, a lift value L which is detected by the lift sensor 24 upon a lapse of the above predetermined period of time is stored into an associated register as a new reference zero position L$\Phi$. The above predetermined period of time (3 seconds) is determined in consideration of the response lag of the exhaust gas recirculation valve 19, that is, a length of time passing from the moment at which a lift command value LMAP is read from a map memory for actuation of the EGR control valves 21, 22 to introduce atmospheric pressure or intake pipe absolute pressure into the negative pressure chamber 19c through the conduits 23, 20, to the moment at which the valve body 19a is moved into a required valve opening position or a full closing position. Of course, no renewal of the reference zero position L$\Phi$ takes place so long as the answers to the questions of the steps 3, 4 remain negative.

Figure 7:
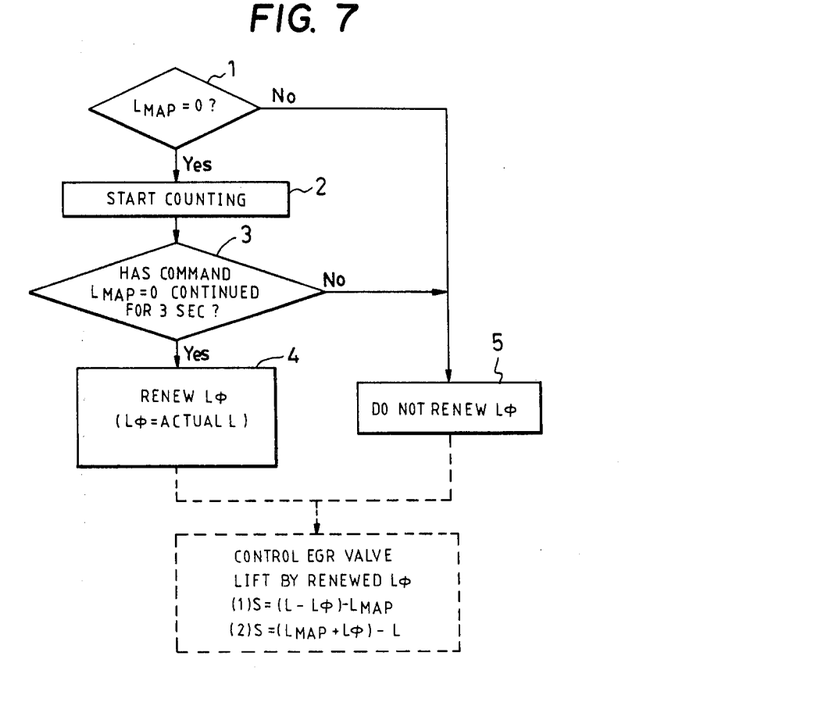
FIG. 7 is a flow chart showing a subroutine for correction of the reference zero position of the exhaust gas recirculation valve.

After the renewal of the reference zero position L$\Phi$ has been made, exhaust gas recirculation control is carried out in a usual manner, using the new value of the reference zero position L$\Phi$, so as to minimize or make zero the difference between a lift command value LMAP selected as a function of engine rpm Ne and absolute pressure PB, which are subsequently detected, and a lift L which is subsequently detected by the lift sensor 24, by correcting either one of the above values LMAP and L by means of the new value L$\Phi$. That is, the amount of control of the solenoid of the EGR control valve 21, 22 can be determined by using either of the following equations:

$$S=(L-L\Phi)-LMAP \quad (5)$$
$$S=(LMAP+L\Phi)-L \quad (6)$$

where S represents the amount of control of the solenoid of the EGR control valve 21 or 22.

Referring to FIG. 8, there is illustrated in block diagram an embodiment of the automatic correcting device according to the invention, which is provided within the ECU 5 for executing the reference zero position correcting subroutine for the exhaust gas recirculation valve, shown in FIG. 6 and described above. The engine rpm sensor 11 in FIG. 1 is connected to a counter 26 for counting the engine rpm Ne, and the absolute pressure sensor 8 to a first A/D converter 28, respectively. The outputs of the counter 26 and the converter 28 are connected to the input of an engine operating condition detecting circuit 30 by way of an Ne value register 27 and a PB value register 29, respectively. Connected to the output of the detecting circuit 30 is a memory 31 which stores a plurality of predetermined lift command values LMAP of the LMAP value map and which is connected to a comparator 32 for supplying same with a selected one of the predetermined lift command values through one input terminal 32a thereof. The comparator 32 has another input terminal 32b to which is connected a memory 33 which stores a value of 0 corresponding to a lift command value of 0. The comparator 32 has an output terminal 32c connected to a reset pulse input terminal R of a counter 36 by way of an OR circuit 34, and another output terminal 32d to a clock pulse input terminal CK of the same counter 36 by way of an AND circuit 35, respectively. The AND circuit 35 has an input terminal connected to a reference clock generator 37 to be supplied therefrom with clock pulses having a constant pulse repetition period but not in synchronism with the TDC signal. A comparator 38 has input terminals 38a and 38b connected, respectively, to the above counter 36 and a memory 39 storing a value indicative of a predetermined period of time (e.g. 3 seconds), respectively, and output terminals 38c and 38d connected to a D-input terminal of a first D flip flop 41 forming part of a one shot multivibrator, by way of an OR circuit 40. The first D flip flop 41 has its Q-output terminal connected to a D-input terminal of a second D flip flop 42 as well as an input terminal of an AND circuit 43. The second flip flop 42 has its $\overline{Q}$-output terminal connected to another input terminal of the AND circuit 43, and its Q-output terminal to an input terminal of another AND circuit 44, respectively. Connected to the clock input terminals CK of the flip flops 41, 42 and another input terminal of the AND circuit 44 is the aforementioned reference clock generator 37 for applying its clock pulses thereto. The output of the AND circuit 44 is connected to the input of an OR circuit 34, referred to hereinlater, and the output of the AND circuit 43 to a second A/D converter 47, also referred to hereinlater, respectively.

Figure 8:
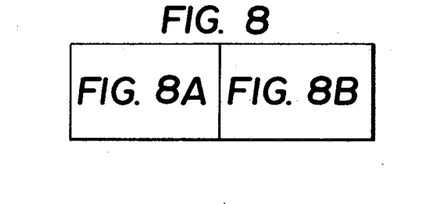
FIGS. 8A, 8B is a circuit diagram illustrating the circuit configuration of an automatic reference zero position correcting device according to one embodiment of the present invention.
Figure 8A:
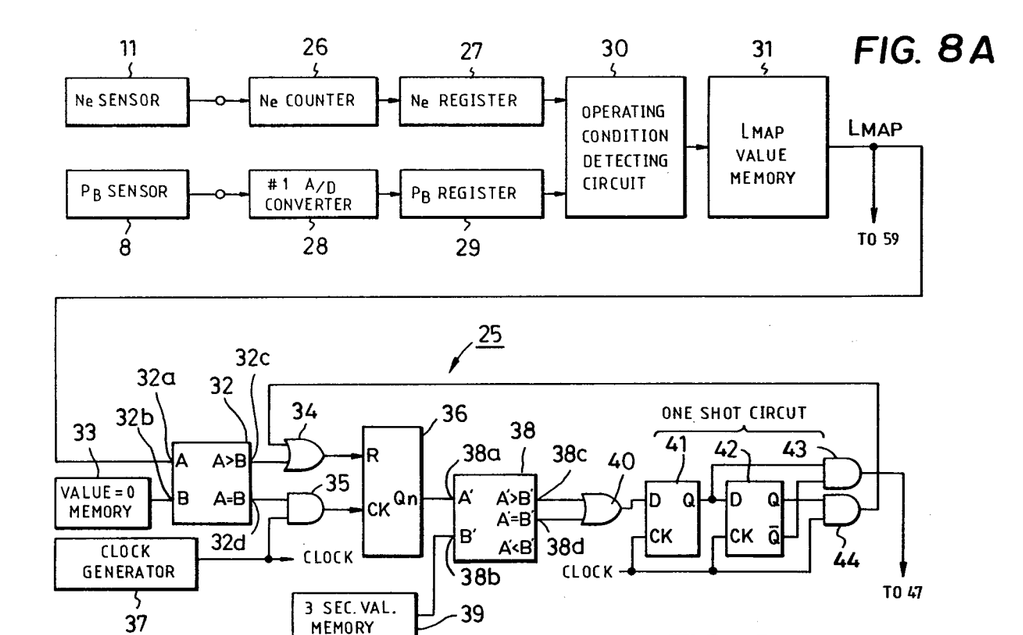
Figure 8B:
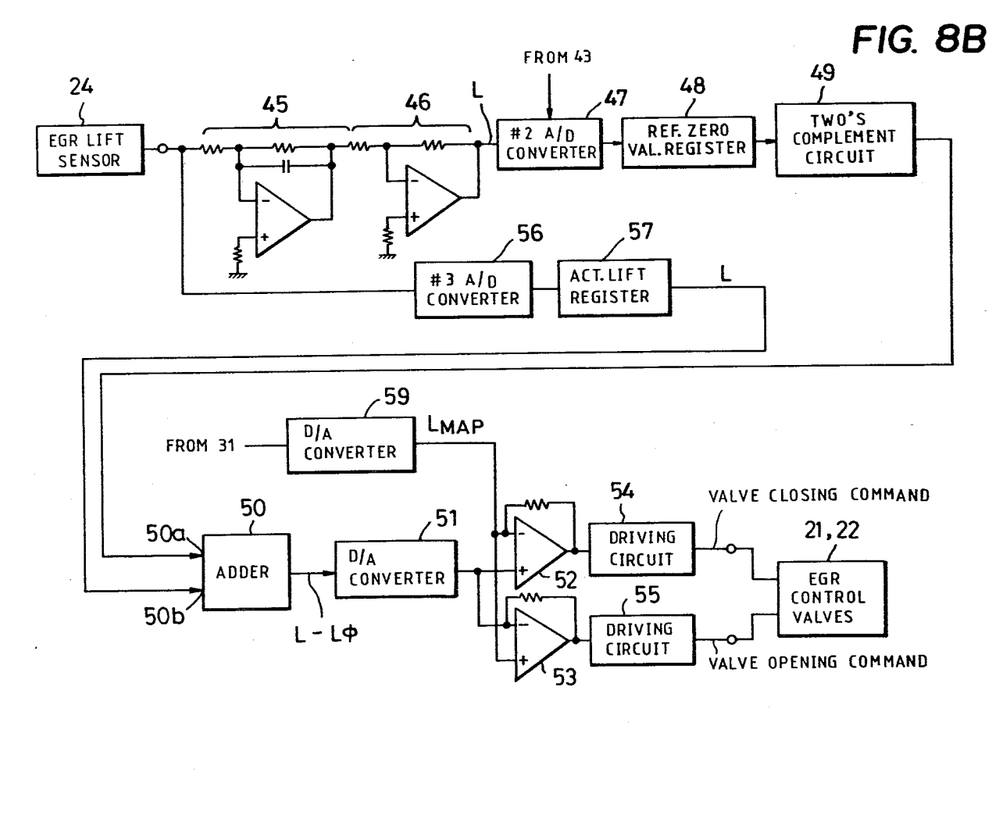

On the other hand, the lift sensor 24 in FIG. 1 is connected to the input of a reference zero value register 48 through an inverting type integrator circuit 45, an inverter 46 and the aforementioned second A/D converter 47. The reference zero value register 48 has its output connected to an input terminal of an adder 50 by way of a two's complement circuit 49. The lift sensor 24 is also connected to another input terminal 50b of the adder 50 by way of a third A/D converter 56 and an actual valve lift value register 57. The adder 50 has its output connected, through a D/A converter 51, to the non-inverting input terminal of an operational amplifier 52 forming a first comparator, and the inverting input terminal of an operational amplifier 53 forming a second comparator. The inverting input terminal of the amplifier 52 and the non-inverting input terminal of the amplifier 53 are connected to the output of the aforementioned lift command value memory 31 through a D/A converter 59, while the outputs of these amplifiers 52, 53 are connected to the solenoids of the EGR control valves 21, 22 in FIG. 1, by way of their respective driving circuits 54 and 55.

The operation of the reference zero position automatic correcting device 25 constructed above will now be described. Pulses of the TDC signal detected by the engine rpm sensor 11 are inputted to the engine rpm counter 26 which counts the number of clock pulses generated between two adjacent pulses of the TDC signal and applies its count to the Ne value register 27 for storage therein. On the other hand, the output signal of the absolute pressure sensor 8 is applied to the first A/D converter 28 which converts the signal into a corresponding digital signal and applies it to the PB value register 29 for storage therein. The stored values in the registers 27, 29 are applied to the engine operating condition detecting circuit 30. The circuit 30 operates to cause the lift command value memory 31 to selectively generate a lift command value LMAP corresponding to the Ne value and the PB value inputted thereto, and the value LMAP thus read out is applied to the input terminal 32a of the first comparator 32 as an input signal A. The first comparator 32 compares the above selected lift command value LMAP with a value of 0 inputted thereto as an input signal B through its input terminal 32b from the memory 33. When the value of the signal A is larger than that of the signal B, that is, the input value LMAP is larger than zero, the comparator 32 outputs a binary signal of 1 at its output terminal 32c and applies it to the counter 36 through the OR circuit 34, to reset the count in the counter 36 to zero. On the other hand, when the value of the signal A is equal to that of the signal B, that is, the input value LMAP is zero, the comparator 32 applies a binary output of 1 to one input terminal of the AND circuit 35. The AND circuit 35 then allows reference clock pulses applied to its other input terminal by the reference clock generator 37 to be applied to the clock input terminal CK of the counter 36, as long as it is supplied with the above output of 1 from the comparator 32. The counter 36 counts these clock pulses and successively applies its count to the input terminal 38a of the second comparator 38 as an input signal A'. The second comparator 38 compares this count A' with the value of an input signal B' applied thereto through its other input terminal 38b from the memory 39, which corresponds to the predetermined period of time, e.g. 3 seconds. When the relationship of A'≧B' stands, the comparator 38 applies a binary output of 1 to the D-input terminal of the first D flip flop 41 of the one shot multivibrator through the OR circuit 40. Upon a first clock pulse being applied to the clock input terminal CK of the first D flip flop 41 after the above binary output of 1 has been applied to the D flip flop 41, the D flip flop 41 generates a binary output of 1 at its Q-output terminal and applies it to one input terminal of the AND circuit 43 and the D-input terminal of the second D flip flop circuit 42. After being supplied with this output of 1, the second D flip flop circuit 42 continuously operates a binary output of 1 at its $\overline{Q}$-output terminal and applies it to the other input terminal of the AND circuit 43 until a second clock pulse following the above-mentioned first clock pulse is applied to its clock input terminal CK. Accordingly, the AND circuit 43 generates a single pulse at an instant between the moment of inputting of the above-mentioned first clock pulse to the flip flop 42 and the moment of inputting of the above-mentioned second clock pulse to same, and applies this single pulse to the second A/D converter 47 to render it operative. On the other hand, upon being supplied with the above second clock pulse, the second D flip flop 42 generates a binary output of 1 at its Q-output terminal and applies it to one input terminal of the AND circuit 44, which in turn generates a single pulse upon being supplied at its other input terminal with a third clock pulse and applies the single pulse to the OR circuit 34 to cause the count in the counter 36 to be resetted to zero.

On the other hand, the second A/D converter 47, which, as previously noted, has been rendered operative by the single pulse inputted thereto from the AND circuit 43 upon passage of the predetermined period of time (3 seconds) counted during which a selected lift command value LMAP is continuously judged to equal to zero, is supplied with an analog output signal of the lift sensor 24 which has its noise component removed by the inverting type integration circuit 45 and then has its level inverted by the inverter 46. This analog signal is converted into a corresponding digital signal by the A/D converter 47 and then stored into the reference zero value register 48 as a new reference zero value LΦ. For the convenience of adding operation at the adder 50, the lift value thus stored in the register 48 is then applied to the two's complement circuit 49 which in turn generates a value equal to the two's complement of the actual lift value LΦ and applies it to one input terminal 50a of the adder 50. The adder 50 has its other input terminal 50b supplied with an actual lift value signal L outputted from the lift sensor 24, which has been converted into a corresponding digital signal by the third A/D converter 56 and once stored into the actual lift value register 57. Thus, the adder 50 adds the two's complement supplied through its input terminal 50a and the actual lift value L supplied through its input terminal 50b. In this manner, substantial substraction is effected of the value LΦ stored in the register 48, which is treated as a new reference zero value of the valve lift of the exhaust gas recirculation valve 19, from the detected actual lift value L, to obtain a difference of L−LΦ. The differential value L−LΦ is then converted into a corresponding analog signal at the D/A converter 51, which is then applied to the operational amplifier 52 through its non-inverting input terminal as well as to the operational amplifier 53 through its inverting input terminal. As previously noted, the inverting input terminal of the operational amplifier 52 and the non-inverting input terminal of the operational amplifier 53 are supplied with an analog signal indicative of a lift command value LMAP selected from the memory 31 as a function of actual Ne value and actual PB value, through the D/A converter 59. When the analog signal indicative of the differential value L-LΦ is larger in value than the analog signal indicative of the selected lift command volume LMAP, that is, the actual valve lift is larger than the selected lift command value LMAP, the comparator formed of the operational amplifier 52 operates in response to the difference between the two analog signals to cause the driving circuit 54 to energize one or both of the solenoids of the EGR control valves 21, 22 in FIG. 1 so as to displace the exhaust gas recirculation valve 19 in its closing direction. Inversely, when the analog signal indicative of the differential value L-LΦ is smaller in value than the analog signal of the selected lift command value LMAP, the comparator formed of the operational amplifier 53 operates in response to the difference between the two analog signals to cause the driving circuit 55 to displace one or both of the solenoids of the EGR control valves 21, 22 in its opening direction. When the differential output of the above two comparators, namely, the differential value between the detected actual lift value L-LΦ and the selected lift command value LMAP falls within a predetermined insensitive zone defining range, the driving circuits 54, 55 operate such that the valve lift of the valve 19 remains unchanged, and when the above differential value falls outside the above insensitive zone defining range but smaller than a predetermined value, the driving circuits 54, 55 operate such that one of the EGR control valves 21, 22 has its solenoid energized with duty factor-controlled pulses supplied from an associated one of the driving circuits 54, 55, while simultaneously the other valve is kept in its full closing position, thus correcting the valve lift of the valve 19 in a slow manner. When the above differential value exceeds the above predetermined value, one of the EGR control valves 21, 22 is kept in its full closing position, and simultaneously the other valve in its full opening position, respectively, thus correcting the valve lift of the valve 19 in a rapid manner.

Figures 9, 9A:
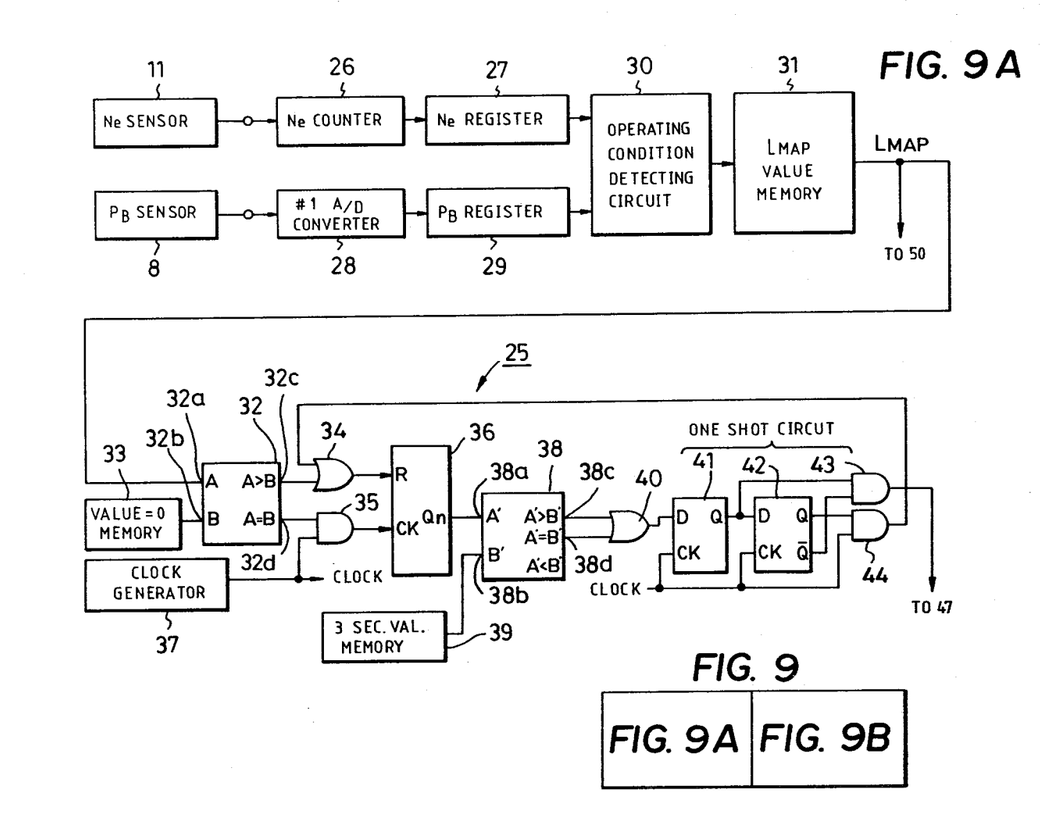
FIGS. 9A, 9B is a circuit diagram illustrating the circuit configuration of an automatic reference zero position correcting device according to another embodiment of the present invention.
Figure 9B:
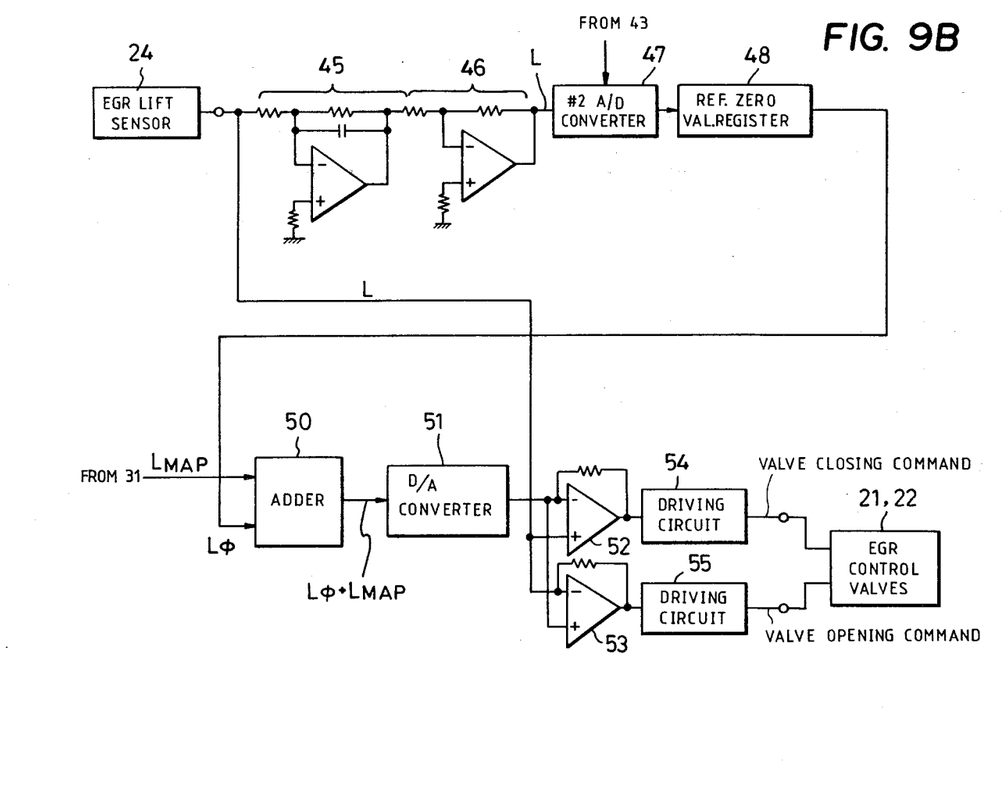

FIG. 9 illustrates another embodiment of the reference zero position automatic correcting device according to the invention. In FIG. 9, elements corresponding to those in FIG. 8 are designated by identical reference numerals. In the embodiment of FIG. 9, the equation (6) previously referred to is applied for control of the EGR control valves 21, 22. Directly connected to the input of the adder 50 are the output of the reference zero value register 48 which stores a detected lift value L supplied from the second A/D converter 47, as a renewed reference zero lift value LΦ, as well as the output of the lift command value memory 31. The output of the adder 50 is connected to the inverting input terminal of the operational amplifier 52 forming a first comparator and the non-inverting input terminal of the operational amplifier 53 forming a second comparator, by way of the D/A converter 51. The non-inverting input terminal of the operational amplifier 52 and the inverting input terminal of the operational amplifier 53 are directly connected to the lift sensor 24. The other parts of the arrangement according to this embodiment are arranged in an identical manner with the arrangement of FIG. 7, description of which is therefore omitted.

The operation of the FIG. 9 embodiment is as follows: The adder 50 is supplied with a digital signal LΦ indicative of a detected actual valve lift value which is outputted from the second A/D converter 47 which is rendered operative upon passage of teh predetermined period of time (e.g. 3 seconds) during which a selected lift command value of 0 is continuously judged to be equal to zero, and then stored into the register 48. The adder 50 is also supplied directly with a selected lift command value LMAP from the lift command value memory 31. Addition of the two values LMAP and LΦ is carried out by the adder 50, and the resultant sum LMAP+LΦ is converted into a corresponding analog signal by the D/A converter 51, which is then applied to the operational amplifiers 52, 53. As previously mentioned, the operational amplifiers 52, 53 are also supplied with a detected actual valve lift value L from the lift sensor 24. Thus, like the arrangement of FIG. 8, the comparators formed of the operational amplifiers 52, 53 operate in response to the difference between the two input values LMAP+LΦ and L to actuate the respective driving circuits 54, 55 for driving the EGR control valves 21, 22 in FIG. 1 so that the above difference becomes zero.

What is claimed is:

1. An exhaust gas recirculation system for combination with an internal combustion engine having an intake pipe and an exhaust pipe, said system comprising: an exhaust gas recirculation passageway connecting said exhaust pipe of said engine to said intake pipe thereof; an exhaust gas recirculation valve having a controllable valve opening and arranged across said exhaust gas recirculation passageway for opening and closing same; means for detecting a particular opening condition of said engine where recirculation of exhaust gases should be effected from said exhaust pipe to said intake pipe through said exhaust gas recirculation passageway; first memory means storing a plurality of different required valve opening values of said exhaust gas recirculation valve, which are functions of operating condition of said engine; sensor means for detecting an actual value of the valve opening of said exhaust gas recirculation valve; means for determining the difference between a valve opening value detected by said sensor means and a required valve opening value read from said first memory means; control means for controlling the valve opening of said exhaust gas recirculation valve so as to minimize said difference obtained by said difference determining means; means for determining whether or not a required valve opening value read from said first memory means corresponds to full closing of said exhaust gas recirculation valve; timer means adapted to generate a signal when said full closing command determining means continuously generates a signal indicative of a required valve opening value read from said first memory means corresponding to full closing of said exhaust gas recirculation valve, for a predetermined period of time; second memory means adapted to store as a reference value a valve opening value which is detected by said sensor means when said second memory means is supplied with said signal generated by said timer means; and means for correcting one of a valve opening value subsequently detected by said sensor means and a required valve opening value subsequently read from said first memory means, by said value stored in said second memory means.

2. The exhaust gas recirculation control system as claimed in claim 1, wherein said correcting means comprises arithmetic means for subtracting said value stored in said second memory means from said valve opening value subsequently detected by said sensor means.

3. The exhaust gas recirculation control system as claimed in claim 1, wherein said correcting means comprises arithmetic means for adding said value stored in said second memory means to said required valve opening value subsequently read from said first memory means.

4. The exhaust gas recirculation control system as claimed in claim 1, wherein said timer means is arranged to have a count thereof resetted to zero each time said full closing command determining means continuously generates said signal indicative of said read required valve opening value corresponding to full closing of said exhaust gas recirculation valve, for said predetermined period of time.

5. The exhaust gas recirculation control system as claimed in claim 1, wherein said exhaust gas recirculation valve comprises: a valve body arranged for opening and closing said exhaust gas recirculation passageway; a diaphragm coupled to said valve body; a negative pressure chamber defined by said diaphragm; a first passageway connecting said negative pressure chamber to said intake pipe of said engine for introducing absolute pressure in said intake pipe into said negative pressure chamber; a second passageway communicating said negative pressure chamber with the atmosphere for introducing atmospheric pressure into said negative pressure chamber; and control valve means arranged to be controlled by said control means for controlling the openings of said first and second passageways, whereby said control valve means operate to control introduction of absolute pressure in said intake pipe of said engine and atmospheric pressure into corresponding ones of said first and second passageways, for displacement of said valve body.

6. The exhaust gas recirculation control system as claimed in claim 5, wherein said predetermined period of time corresponds to a period of time passing from when a required valve opening value is read from said first memory means to when said valve body is displaced, through operation of said control valve means, to a valve opening position determined by said read required valve opening value.

* * * * *